W. LIEBER.
ANIMAL FEEDER.
APPLICATION FILED MAR. 21, 1917.
1,282,092.
Patented Oct. 22, 1918.
2 SHEETS—SHEET 2.
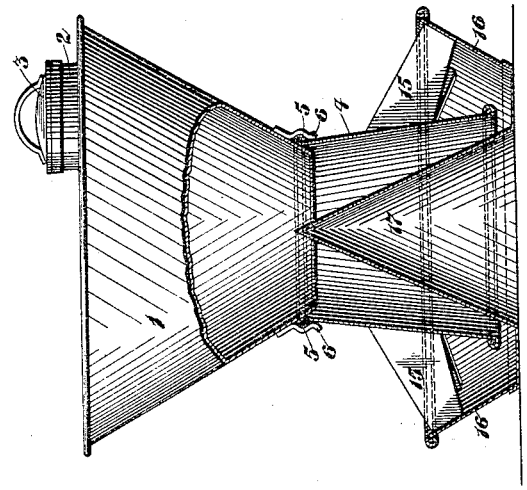
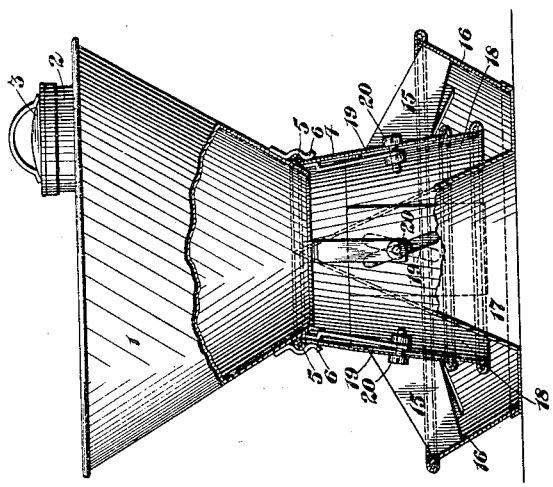
Attest:
Charles A. Becker
Inventor.
William Lieber,
by Rippey & Kingsland
His Attorneys.

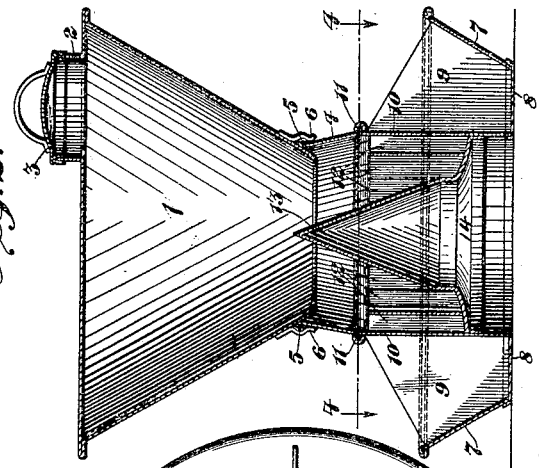

UNITED STATES PATENT OFFICE.

WILLIAM LIEBER, OF BOONEVILLE, MISSOURI, ASSIGNOR OF THREE-FIFTHS TO DANIEL A. RUEBEL, OF ST. LOUIS, MISSOURI.

ANIMAL-FEEDER.

1,282,092.  Specification of Letters Patent.  Patented Oct. 22, 1918.

Application filed March 21, 1917. Serial No. 156,301.

*To all whom it may concern:*

Be it known that I, WILLIAM LIEBER, a citizen of the United States, residing at Booneville, Cooper county, Missouri, have invented a new and useful Animal-Feeder, of which the following is a specification.

This invention relates to animal feeders. An object of the invention is to provide an improved device for dispensing feed to animals and poultry, comprising a receptacle for the feed, having communication into a trough preferably provided with partitions dividing the trough into stalls or compartments, a distributing device within the receptacle for causing proper distribution of the feed to the compartments in the trough, and means for regulating the supply of the feed entering the trough.

Another object of the invention is to provide a feed dispenser comprising a receptacle arranged to receive and contain the feed, a trough provided with partitions dividing the trough into separate stalls or compartments, independently movable doors or closures for opening and closing communication between the receptacle and the respective stalls and capable of movement to open position by the animal, so that the supply of feed delivered into each stall is controlled by the animal feeding therein, the doors being arranged to close under pressure of the feed within the receptacle, except when moved to open position by the animal.

Another object of the invention is to provide a device of the character mentioned comprising a receptacle for the feed and a trough arranged to receive the feed from the receptacle, in combination with means for varying the dimensions of the communication between the trough and the receptacle in order to control the quantity of feed which can pass into the trough from the receptacle.

Other objects will appear from the following description, reference being made to the accompanying drawing in which I have illustrated preferred embodiments of the device, and in which—

Figure 1 is a side elevation of the feeder having doors or closures controlling the delivery of the feed into the trough and capable of being opened by the animals feeding in the trough.

Fig. 2 is a vertical sectional view of the device.

Fig. 3 is a plan view of the lower part of the device, the upper removable part of the feed receptacle being detached.

Fig. 4 is a horizontal sectional view on the line 4—4 of Fig. 2.

Fig. 5 is a perspective view of a part of the feed receptacle illustrating one of the doors controlling the communication between the feed receptacle and the trough.

Fig. 6 is a combined elevation and sectional view illustrating a modified construction in which communication between the feed receptacle and the trough is controlled by adjustable closures capable of adjustment to vary the dimensions of the communicating passage and thus regulate the delivery of the feed into the trough.

Fig. 7 is a combined elevation and sectional view of another modification in which the communication between the feed receptacle and the trough is of reduced dimensions and permanently open.

Referring first to the device illustrated in Figs. 1 to 5 inclusive, it will be observed that the receptacle comprises two parts which are detachably connected. The upper part 1 is preferably in the form of a hopper provided with an inclosing top wall having an opening through which feed may be delivered into the receptacle. The opening is preferably surrounded by a wall or flange 2 which receives a removable closure 3. The lower portion 4 of the receptacle is open at its upper end and is formed preferably with an encircling flange or bead 5. The lower end of the hopper 1 seats within the upper end of the part 4 of the receptacle so that the feed delivered into the hopper is automatically discharged therefrom into the lower part of the receptacle, from which it is enabled to pass into the feed trough as hereinafter explained. In order to retain the hopper 1 in proper connection with the remaining part of the device the lower part thereof is equipped with a number of spring clamps 6 which engage with the roll or bead 5 and, by their pressure thereagainst, retain the two parts in proper connection.

A trough is formed around the lower part of the receptacle and is defined by the wall of the receptacle part 4 and by an outer oblique wall 7 united with the wall 4 by a bottom wall 8. The trough is divided into a number of separate stalls or compartments by partitions 9 secured between the walls of the trough and radiating from the lower part of the receptacle as illustrated in Fig. 3. Each of the stalls or compartments is of sufficient size to enable an animal of the kind for which the device is intended to feed therefrom and to exclude any other animal from crowding in to feed from the same stall or compartment. Provision is made whereby the animal may supply itself with feed from the receptacle, and for this purpose an independently movable door is provided for each stall.

The doors of appropriate construction are illustrated in Figs. 3, 4 and 5, in which it will be observed that each door comprises a closure plate 10 hinged upon a rod 11 supported by the wall of the feed container and movable to and from position to close the opening in which the door is mounted. The door presents a smooth exterior surface, and on its interior is provided with a V-shaped feed separating element 12 which enables the door to be forced inwardly by minimum pressure in order to permit the feed to be delivered into the trough. It is intended that the animal feeding from each stall shall engage the smooth exterior surface of the door controlling the communication between the stall and the feed container and press the door inwardly to enable the feed to flow into the trough. It is obvious that when pressure against the door is removed or released by the animal, the door will be closed by the pressure of the feed within the compartment. In this way, only the proper or necessary amount of feed will be delivered into the trough and there will be a minimum amount of waste, inasmuch as the animals will not release any greater amount of feed than they require.

In order to divert or deflect the feed properly and uniformly toward all of the doors a deflecting device 13. in the form of a cone, is mounted concentrically within the compartment and is provided with a flared portion 14 at its lower extremity which deflects the feed toward the openings closed by the doors. Thus, when any door is opened the feed within the compartment will be caused to pass through the open door by the construction and arrangement of the deflecting cone 13 and the flared wall 14. It is also apparent that by this device the feed will be evenly distributed toward all of the doors and will not become aggregated or massed in any particular isolated position.

In the modification illustrated in Fig. 6 the upper part of the receptacle, comprising the hopper, is the same as the upper part of the receptacle illustrated in Figs. 1 and 2, and the same reference numerals are applied to similar parts. However, the lower part of the device illustrated in Fig. 6 differs in certain particulars from the lower part of the device illustrated in Figs. 1 to 5 and requires separate description.

In the device shown in Fig. 6 the lower part 4 of the receptacle is supported by a series of radial arms 15 having their outer ends attached to the outer wall 16 of the trough. The inner wall of the trough is formed by the distributing cone 17. The lower end of the receptacle 4 terminates some distance above the bottom of the trough and the communication or opening thus formed between the receptacle and the trough is capable of variation as to size by a series of adjustable arcuate plates 18. The plates 18 fit within the receptacle 4 and have appropriately formed slots 19 which receive the bolts or screws 20. By releasing the bolts or screws 20 the plates 18 may be raised or lowered as desired to vary the size of the communicating passage from the receptacle to the trough, and said plates may be retained in any adjustment in which they are placed by tightening the bolts 20 which serve as clamps to retain the plates in proper positions. By this construction the passage from the receptacle into the trough may be retained open for any desired period and then closed to prevent the animals from obtaining any additional quantity of feed therefrom. Also, by opening the passage any desired quantity of feed may be delivered into the trough and then the plates 18 may be lowered to close the communication while the animals are feeding.

The construction illustrated in Fig. 7 is the same as that illustrated in Fig. 6 with the exception that the plates 18 are dispensed with in Fig. 7, and the communicating passage between the receptacle and the trough is permanently open, though of small dimensions. This enables a constant supply of feed to be delivered into the trough so that the animals may obtain feed at any time.

It is probable that other modifications will readily suggest themselves to users of the device, and it will be understood that I do not confine myself to specific features illustrated and described.

What I claim and desire to secure by Letters Patent of the United States, is:—

1. In an animal feeder, a receptacle for the feed comprising an inclosing wall having a series of openings therethrough, a rod supported by the inclosing wall above said openings, plates hinged to said rod for closing said openings respectively, a conical member extending upwardly within the inclosure formed by the inclosing wall, a flared portion extending from the lower end of the conical member to said wall below the openings, a trough for receiving the feed discharged through the openings, partitions secured to the wall of the trough and to the wall of said receptacle between said openings, and a hopper detachably secured to the upper end of the wall of said receptacle.

2. In an animal feeder, a receptacle for the feed comprising an inclosing wall having a series of openings therethrough, a rod supported by the inclosing wall above said openings, plates hinged to said rod for closing said openings respectively, a conical member extending upwardly within the inclosure formed by the inclosing wall, a flared portion extending from the lower end of the conical member to said wall below the openings, a trough for receiving the feed discharged through the openings, partitions secured to the wall of the trough and to the wall of said receptacle between said openings, an external roll formed at the upper end of the wall of said receptacle, a hopper having its lower end extending into said receptacle and bearing against said roll, and spring clasps in connection with said hopper releasably engaging said roll to hold the hopper in position.

3. In an animal feeder, a receptacle for the feed comprising a wall having openings therethrough, a wall supported by said wall above said openings, doors hinged to said rod for closing said openings respectively, an exterior roll at the upper end of said wall, a hopper extending into the upper end of said receptacle and bearing against said wall, and spring clasps in connection with said hopper releasably engaging said roll and holding the hopper in position on said receptacle.

4. In an animal feeder, a receptacle for the feed comprising a wall having openings therethrough, a rod supported by said wall above said openings, plates hinged to said rod for closing said openings respectively, an external roll in connection with said wall at its upper end, a hopper bearing upon the upper end of said wall, spring clasps in connection with said hopper releasably engaging said roll to hold the hopper in position, a passage through which the feed may pass into the hopper, and a closure for said passage.

In witness whereof, I have signed this specification in the presence of two subscribing witnesses.

WILLIAM LIEBER.

Witnesses:
F. DANWALTER,
JACOB DECK.

Copies of this patent may be obtained for five cents each, by addressing the "Commissioner of Patents, Washington, D. C."

It is hereby certified that in Letters Patent No. 1,282,092, granted October 22, 1918, upon the application of William Lieber, of Booneville, Missouri, for an improvement in "Animal-Feeders," an error appears in the printed specification requiring correction as follows: Page 3, line 29, claim 3, for the word "wall," first occurrence, read *rod;* and that the said Letters Patent should be read with this correction therein that the same may conform to the record of the case in the Patent Office.

Signed and sealed this 26th day of November, A. D., 1918.

[SEAL.]

R. F. WHITEHEAD,

*Acting Commissioner of Patents.*

Cl. 119—54.